July 13, 1926.

J. KARASIEWICZ

SUN VIEWING DEVICE

Filed Sept. 19, 1925

1,592,528

INVENTOR.
Joseph Karasiewicz
BY
ATTORNEY

Patented July 13, 1926.

1,592,528

UNITED STATES PATENT OFFICE.

JOSEPH KARASIEWICZ, OF SOUTH AMBOY, NEW JERSEY.

SUN-VIEWING DEVICE.

Application filed September 19, 1925. Serial No. 57,305.

This invention relates generally to a device for observing the sun, the invention having more particular reference to a novel type of device for this purpose. The invention has for an object the provision of an improved device which may be readily and easily manipulated. A further object is to provide a device of this nature which will permit of viewing the sun, at such times as when an eclipse may occur, or to observe sun spots or any peculiar phenomenon, by means of a colored transparent piece, or by a combination of two or more such pieces of different color.

For further comprehension of the invention, and of the objects and advantages thereof, reference will be had to the following description and accompanying drawing and to the appended claims in which the various novel features of the invention are more particularly set forth.

Figure 1:
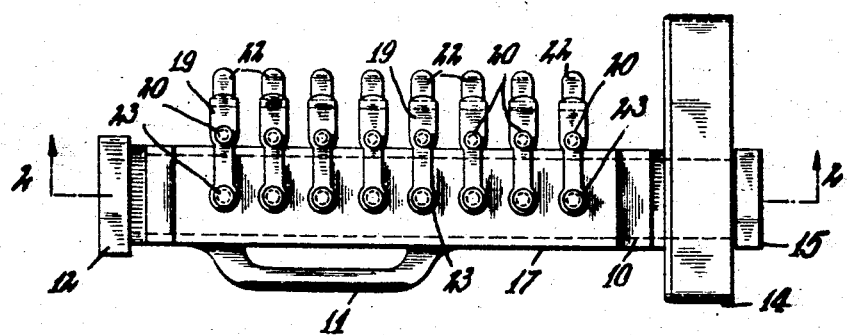
Fig. 1 is a top plan view of my improved device for observing the sun.
Figure 2:
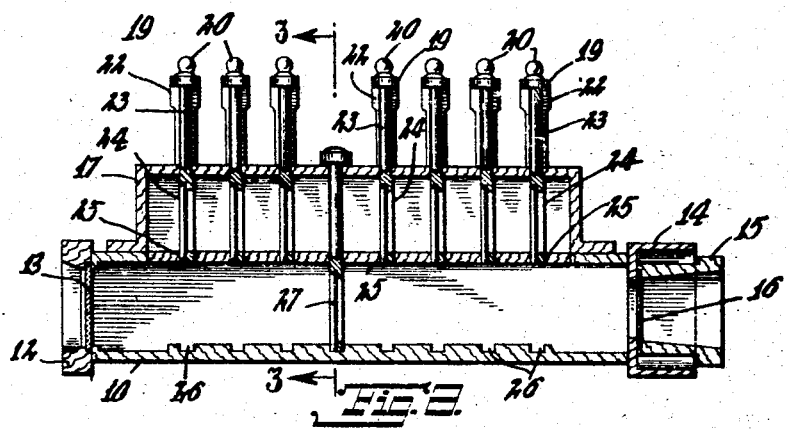
Fig. 2 is a longitudinal sectional view taken on the line 2—2 of Fig. 1.
Figure 3:
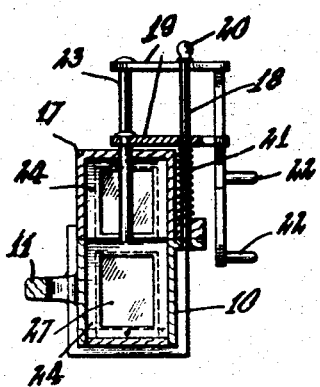
Fig. 3 is a transverse sectional view taken on the line 3—3 of Fig. 2.
Figure 4:
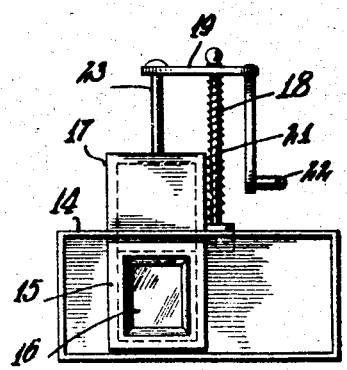
Fig. 4 is a front elevational view.

As here embodied my improved device for observing the sun comprises a box 10 or enclosure with a suitable and conveniently located handle 11, and open at both ends to which are attached the eye piece 12, having a glass 13 or lens in its aperture or center opening, and the front piece 14, to which is attached the visor 15 having a glass 16 or lens in its aperture or center opening, the said front piece 14 having a similar aperture or center opening to register with the said aperture or center opening of the said visor 15.

Box 10 having attached at its top side an enclosure 17 and rigidly attached thereto a plurality of perpendicular rods 18 and slidably attached thereto cross pieces 19, perpendicular rods 18 having attached at their uppermost ends, caps 20 or retaining pieces for the said cross pieces 19, coil springs 21 being placed on the perpendicular rods 18 below the cross pieces 19.

The said cross pieces 19 having attached at or near their one extremities suitable and convenient handles 22 or operating levers, and at or near their other extremities perpendicular supports 23 extending through the top of the enclosure 17 and having attached at their lower extremities suitable frames 24, said frames 24 being a slidable fit in the said enclosure 17 and the box 10, and held in position by slots 25 in the top of box 10 and engaging in grooves 26 when in their lower positions. Frames 10 having apertures or center openings, similar to the heretobefore mentioned aperture or center opening in the eye piece 12 and the visor 15, to accommodate and hold the various colored pieces 27 which may be of celluloid, glass or any other similar material. The construction being such as will permit of any of the said colored pieces 27 to be slid in a visual position between the said glass 13 and the said glass 16 as designated by the numeral 28 in the accompanying drawing and being accomplished by the said handles 22, it being understood that any desired number of the colored pieces 27 may be slid into a visual position at the same time should a combination of colors be required. The coil springs 21 being used to return and hold the colored pieces 27 out of the "in use" position.

It will be understood that my improved device may be made of any suitable materials such as wood, composition, fibre and the like.

Having herewith described my improved device in detail, the use and manipulation of the same is obvious.

While I have above described the preferred form, construction, and arrangement of the several elements employed, it will be understood that the device is nevertheless susceptible of considerable modification therein, and I therefore reserve the privilege of resorting to all such changes as may be fairly embodied within the spirit and scope of the invention as claimed.

Having thus described my invention what I claim as new and desire to protect by Letters Patent of the United States is as follows:—

1. In a device for observing the sun, having a front eye piece, and a rear visor, the combination of a box being open at opposite ends to one of which is attached said eye piece, and to the other said visor, a supporting handle depending from the side of said box, a closure compartment attached to said box, colored pieces slidably mounted in said closure and box, and means for sliding one or more of said colored pieces in a visual position between said eye piece and visor.

2. In a device for observing the sun, having a front eye piece, and a rear visor, the combination of a box being open at opposite ends to one of which is attached said eye piece, and to the other said visor, a closure compartment attached to the top side of said box, colored pieces slidably mounted in said closure and box, and means for sliding one or more of said colored pieces in a visual position between said eye piece and visor.

3. In a device for observing the sun, having a front eye piece, and a rear visor, the combination of a box being open at opposite ends to one of which is attached said eye piece, and to the other said visor, a supporting handle depending from the side of said box, a closure compartment attached to said box, colored pieces slidably mounted in said closure and box, and means for sliding one or more of said colored pieces in a visual position between said eye piece and visor, said means comprising rods rigidly attached to said closure, cross pieces slidable on said rods, expansion spring mounted on said rods beneath said cross pieces, normally urging said cross pieces upwards, operating handles attached to one side of said cross pieces, support members attached to the other side of said cross pieces, the lower ends of said support members project into said closure, and said colored pieces being attached to the lower ends of said support members.

4. In a device for observing the sun, having a front eye piece, and a rear visor, the combination of a box being open at opposite ends to one of which is attached said eye piece, and to the other said visor, a supporting handle depending from the side of said box, a closure compartment attached to said box, colored pieces slidably mounted in said closure and box and means for sliding one or more of said colored pieces in a visual position between said eye piece and visor, said means comprising rods rigidly attached to said closure, cross pieces slidable on said rods, caps attached to the upper ends of said rods to act as a stop for said cross pieces, expansion spring mounted on said rods beneath said cross pieces, normally urging said cross pieces upwards, operating handles attached to one side of said cross pieces, support members attached to the other side of said cross pieces, the lower ends of said support members project into said closure, and said colored pieces being attached to the lower ends of said support members.

In testimony whereof I have affixed my signature.

JOSEPH KARASIEWICZ.